United States Patent [19]
Wendt et al.

[11] Patent Number: 6,063,141
[45] Date of Patent: May 16, 2000

[54] CATHODE FOR A MOLTEN CARBONATE FUEL CELL AND METHOD FOR MANUFACTURING SAME

[75] Inventors: Hartmut Wendt, Dieburg; Hans-Juergen Salge, Darmstadt; Manfred Bischoff, Feldkirchen, all of Germany

[73] Assignee: MTU Motoren-Und Turbinen-Union Friedrichshafen GmbH, Germany

[21] Appl. No.: 09/142,410

[22] PCT Filed: Mar. 5, 1997

[86] PCT No.: PCT/EP97/01094

§ 371 Date: Dec. 18, 1998

§ 102(e) Date: Dec. 18, 1998

[87] PCT Pub. No.: WO97/33332

PCT Pub. Date: Sep. 12, 1997

[30] Foreign Application Priority Data

Mar. 9, 1996 [DE] Germany .......................... 196 09 313

[51] Int. Cl.$^7$ ........................................... H01M 6/00
[52] U.S. Cl. ........................... 29/623.1; 29/746; 205/171; 205/181; 205/220; 205/224; 205/228; 205/333; 429/30; 429/33; 429/40; 429/41; 429/16
[58] Field of Search ..................................... 205/171, 181, 205/220, 224, 228, 333; 429/30, 33, 40, 41, 16; 29/623.1, 746

[56] References Cited

U.S. PATENT DOCUMENTS

| | | | |
|---|---|---|---|
| 5,582,624 | 12/1996 | Jantsch et al. | 29/623.1 |
| 5,589,287 | 12/1996 | Hatoh et al. | 429/16 |

FOREIGN PATENT DOCUMENTS

| | | |
|---|---|---|
| 42 24 290 A1 | 1/1994 | Germany . |
| 43 02 347 C1 | 6/1994 | Germany . |
| WO 94/18713 | 8/1994 | WIPO . |

OTHER PUBLICATIONS

Chemical Abstracts, vol. 119, No. 12, Sep. 20, 1998, JP 05 109 413 A, Apr. 30, 1993, Yamanaka Atsushi et al.
Chemical Abstracts, vol. 103, No. 14, Oct. 7, 1984, JP 60 074 272 A, Apr. 26, 1985, Seta Youichi et al.
Patent Abstracts of Japan, vol. 017, No. 081, Feb. 18, 1993, JP 04 280069 A, Yamanaka Atsushi et al.

*Primary Examiner*—Bruce F. Bell
*Attorney, Agent, or Firm*—Evenson, McKeown, Edwards & Lenahan, P.L.L.C.

[57] ABSTRACT

A method for manufacturing a cathode for a molten carbonate fuel cell includes oxidation of a porous precursor electrode and contact with molten carbonate. Following assembly of a layered arrangement containing the precursor electrode, a matrix layer made of molten carbonate, and a porous anode, the precursor electrode is anodically oxidized with a preset curve for the current density, and doped by contact with molten carbonate.

14 Claims, No Drawings

CATHODE FOR A MOLTEN CARBONATE FUEL CELL AND METHOD FOR MANUFACTURING SAME

BACKGROUND OF THE INVENTION

The invention relates to a method for manufacturing a cathode for a molten carbonate fuel cell by electrochemical oxidation of a porous metallic precursor electrode and contact with molten carbonate, and to a cathode manufactured by the method.

As a rule, porous cathodes made of lithiated nickel oxide are used in molten carbonate fuel cells. It is known from the book "Fuel Cell Handbook" by A. J. Appleby and F. R. Foulkes, Van Nostrand Reinhold, New York, page 546, to shape these cathodes in the fuel cell itself from porous nickel precursor electrodes that are in contact with the molten flux electrolytes, by oxidation with atmospheric oxygen at 600 to 650° C. when putting the cells and/or cell stacks into service. As the chemical reaction

$$Ni + \tfrac{1}{2}O_2 \rightarrow NiO \qquad (1)$$

proceeds, lithium oxide from the melt is incorporated into the nickel oxide toward the end of this oxidation process, and this eventually lends the nickel oxide the p-semiconductor property (specific conductivity approximately 20 S·cm$^{-1}$ at 650° C.) required for its function.

The speed of this formation process determines the morphological properties of the cathode which in turn the nickel oxide toward the end of this oxidation process, and this eventually lends the nickel oxide the p-semiconductor property (specific conductivity approximately 20 S·cm$^{-1}$ at 650° C.) required for its function.

The speed of this formation process determines the morphological properties of the cathode which in turn influence the functional ability and quality of the cathode to a critical degree.

It is desirable to form relatively large porous agglomerates composed of tiny nickel oxide crystals and to form relatively wide pores between the agglomerates. If possible, the small crystals should have diameters of at least a tenth of a micron, while the average diameter of the agglomerates and coarse pores should optimally be between 1 and 7 microns.

A relatively high reaction rate of oxidation favors the formation of the desired cathode structure and morphology, while oxidation of the metal that is too slow, and which can extend for example over periods of more than ten hours, leads to the formation of very coarse nickel oxide crystals which can then measure several microns in diameter, and to the failure of the desired agglomerates to form. The oxidation rate of the nickel metal can be influenced by the oxygen content and the flowrate of the forming gas.

Precise control of the oxidation rate of the nickel metal is difficult for two reasons.

(1) Frequently, heat stagnation caused by the release of the reaction enthalpy of the exothermic reaction explained above causes the formation of temperature peaks in the surface of the cell. To avoid this overheating, the oxygen content of the forming gas must be reduced to a point at which undesirably long reaction times of more than ten hours are no longer avoidable.

(2) It is unavoidable that as a result of leaks in the cell that are statistically distributed over the surface, a small amount of anode gas which has a reducing action crosses over to the cathode side at locally closely limited points and delays the oxidation of the nickel metal there in the vicinity of the point at which it penetrates, so that locally limited formation of undesired coarse nickel oxide structures occurs at that location because of the retarded oxidation of the nickel, and very low current densities are formed during cell operation, in other words there is an undesired nonuniform current density distribution that adversely affects the overall operation of the cell stack.

DETAILED DESCRIPTION OF PREFERRED EMBODIMENTS

The goal of the invention is to provide a method for manufacturing a cathode for a molten carbonate fuel cell with which oxidation is possible without heat stagnation at an adjustable oxidation rate, and to provide a cathode manufactured by the method.

This goal is achieved in a method according to the invention of the species recited at the outset by virtue of the fact that the precursor electrode, following the assembly of a cell containing the precursor electrode, a matrix layer with molten carbonate, and a porous anode, is oxidized anodically with a current density curve that can be set in advance and is doped by contact with molten carbonate. During anodic, i.e. electrochemical oxidation, oxygen ions are produced on the precursor electrode, which is wired as an anode, from oxygen molecules as the result of the absorption of electrons, and the oxygen ions bond with the nickel atoms. The buildup of the nickel oxide layer depends primarily on the magnitude and duration of the current load. It has been found that a homogenous oxidation rate can be achieved during anodic oxidation over the entire surface of the precursor electrode of a fuel cell, as well as in all the fuel cells in a stack.

In a preferred embodiment, at the beginning of anodic oxidation, a higher current density is imposed than toward the end of the oxidation of the precursor electrode. It is possible by imposing the current density, in other words by regulating the reference value of the current density, to specify the oxidation rate exactly so that the reaction rate can be adapted to the reaction time. At the beginning of formation, high current densities produce high reaction rates, while toward the end of formation, low current densities and hence a low rate of reoxidation for increasing lithium uptake and improving the conductivity of the nickel oxide is especially favorable.

To produce lithiated nickel oxide cathodes with an agglomerate structure, in particular precursor cathodes made of porous sintered nickel sponge are anodically oxidized following their installation in the cells of a fuel cell stack.

In an especially favorable embodiment for manufacturing lithiated nickel oxide cathodes, films made of carbonyl nickel are heated in situ and then oxidized anodically following their installation in the cells of a fuel cell stack.

Preferably, in each fuel cell with the precursor electrode, the molten electrolyte is melted, while during anodic oxidation the cathode chamber is flushed with oxygen and/or carbon dioxide and the anode chamber is flushed with a mixture of steam and carbon dioxide.

The gas in the cathode chamber during anodic oxidation is composed essentially of nitrogen and carbon dioxide in a ratio of 1.0/0.0 to 0.0/1.0 volume percent while that in the anode chamber is composed of steam and carbon dioxide in a ratio of 0.1/0.9 to 0.9/0.1 volume percent.

Fuel cell cathodes with relatively large porous agglomerates composed of tiny oxide crystals and with relatively wide pores between the agglomerates can be obtained by the manufacturing method described above. Crystals with cross sections of a few tenths of a micron and agglomerates with coarse pores between 1 and 7 microns can be produced. In addition, the following advantages can be realized:

The influence of the penetration of the anode gas to the cathode that occurs locally no longer has an adverse effect on the oxidation of nickel, since, the reducing action of the anode gas that has penetrated no longer has any effect following an initial coating of the metallic nickel by nickel oxide caused by anodic oxidation because the nickel is no longer available as the required catalyst.

Since, as a counterreaction to the anodic oxidation of nickel at the anode that acts as a cathode during formation, water vapor is reduced to hydrogen in the presence of carbon dioxide in accordance with Equation (2)

$$H_2O + 2e^- + CO_2 \rightarrow H_2 + CO_3^{2-} \quad (2)$$

because of the positive heat tone of the entire reaction $$Ni + H_2O \rightarrow NiO + H_2 \quad (3)$$

the amount of heat developed in the cell during formation is very small.

By means of the method described above, double-layer electrodes can be produced by anodic oxidation of double-layer precursor electrodes made of carbonyl cobalt and carbonyl nickel or from dispersed cobalt and nickel with a suitable distribution. Moreover, the method is favorable for the production of alloy cathodes made of Ni/Co, Ni/Fe, Co/Mn, Co/Fe/Mn, and Fe/Mn.

The invention will now be described in greater detail with reference to embodiments, from which additional details, features, and advantages will be evident.

To produce a cathode from a molten carbonate fuel cell, initially precursor cathodes are produced. A slip is produced, even from nickel powder for example, by adding binders, plasticizers, and other additives from which a thin film is produced. A thin porous nickel sponge is produced from this film by sintering. A film made of loose carbonyl nickel can be used as another starting material.

The precursor electrodes made of thin, porous, sintered nickel sponge or of films made of loose carbonyl nickel that are heated in situ are incorporated into the fuel cells of a stack. Then the molten electrolyte is melted in the matrix. The cathode chamber of the respective fuel cell is then flushed with nitrogen, which is advantageous for transferring the heat as well as for taking up the carbon dioxide that is released in anodic nickel oxidation according to the following equation (4):

$$Ni + CO_3^{2-} - 2e^- \rightarrow NiO + CO_2 \quad (4)$$

while the anode chamber is flushed with a mixture of steam and carbon dioxide (in a volume ratio of 1:1 for example).

During anodic oxidation, the precursor electrode made of nickel is connected as an anode in a DC circuit with which an imposed current can be produced. The DC circuit contains a current regulator whose output current is adjusted according to a guide value.

The anodic oxidation of the nickel sponge on the cathode side, coupled with the cathodic reduction of water on the anode side (Equation (2)) is then started by imposing current densities between 10 and 1000 mA/cm². During the imposition of current densities between 100 and 500 mA/cm², oxidation of the nickel precursor cathode which as a rule has a specific nickel charge of approximately 0.2 g/cm² proceeds in a few hours and the formation can be completed and terminated by hyperoxygenation at much lower current densities.

This method can be used in particular in the same way for making cathodes from lithium cobaltite ($LiCoO_2$), lithium ferrite ($LiFeO_2$), double-layer cathodes like those described in DE 43 03 136 C2 and made of $LiCoO_2$, and lithiated nickel oxide and so-called alloy cathodes (made for example of Ni and CO, Ni and Mn or CO and Fe and Mn) from porous metallic precursor electrodes of suitable composition and structure.

The following examples serve to explain the invention further:

EXAMPLE 1

Manufacture of Lithiated NiO Cathodes Using Anodic Oxidation

As usual, the following are incorporated into the fuel cell: the anode, the matrix, the pre-sintered cathode precursor made of porous nickel, and an electrolyte film if the required amount of electrolyte is not already contained in the components mentioned earlier. After being heated to 650° C., the cell is charged on both the anode and cathode sides with a reducing gas mixture (in volume percent: 10/5/85 $H_2/CO_2N_2$). Then the fuel cell anode is supplied with $H_2O/CO_2$ in a ratio of 1:2 (in volume percent) while the cathode precursor receives a 95/5 $N_2/CO_2$ gas mixture (in volume percent). The cathode precursor is then charged anodically and galvanostatically with 200 mA/cm². After approximately three hours, the cathode precursor is completely oxidized and sufficiently lithiated so that the fuel cell can now begin operation with the usual operating gases. Using this method produces cathodes with a polarization resistance of 0.25 Ω•cm² and/or an IR-free overvoltage of 37.5 mV at 150 mA/cm².

EXAMPLE 2

Manufacture of $LiCoO_2$ Cathodes by Anodic Oxidation

The fuel cell is equipped with an anode, matrix, electrolyte film and a cathode precursor, which is composed of pre-sintered porous cobalt oxide CoO, with $Li_2CO_3$ as the pore former. After heating to 650° C. (gas mixture on the anode side: 10/5/85 $H_2/CO_2/N_2$, on the cathode side (volume percent): 95/5 $N_2/CO_2$ (volume percent) the fuel cell anode is charged with a 2:1 $CO_2/H_2O$ mixture (in volume percent) while the cathode precursor is charged with 95/5 $N_2/CO_2$ gas mixture (in volume percent). The anodic oxidation of the cathode precursor is performed galvanostatically for five hours with a current density of 300 mA/cm². $LiCoO_2$ cathodes are obtained with a polarization resistance of 0.2 Ω•cm² and/or an IR-free (=purified ohmic internal resistance) overvoltage of 30 mV at 150 mA/cm².

EXAMPLE 3

Manufacture of Double-Layer Cathodes ($LiCoO_2$/(Li)NiO) by Means of Anodic Oxidation The fuel cell is equipped with an anode, a matrix, an electrolyte film, and a double-layer cathode precursor as described in WO 94/18713. Following heating to 650° C. (gas mixture on the anode side: 10/5/85 $H_2/CO_2/N_2$ (volume percent), on the cathode side: 5/5/90 $H_2/CO_2/N_2$ (volume percent)) the fuel cell anode is charged with a 2:1 (volume percent) $CO_2/H_2O$ mixture and the cathode precursor is charged with a 95/5 $N_2/CO_2$ gas mixture (in volume percent). Anodic oxidation of the cathode precursor again takes place galvanostatically with a current density of 300 mA/cm² and a duration of five hours. Double-layer cathodes are obtained with a polarization resistance of 0.2 Ω•cm² and/or an IR-free (IR=internal resistance) overvoltage of 30 mV at 150 mA/cm².

What is claimed is:

1. A method for manufacturing a cathode for a molten carbonate fuel cell, comprising:

assembling a layered arrangement comprising a porous precursor electrode, a matrix layer of molten carbonate, and a porous anode in a fuel cell;

anodically oxidizing the porous precursor electrode; using a predetermined current density curve and doping said oxidized precursor electrode by contacting with molten carbonate.

2. The method according to claim 1, wherein a higher current density is imposed at the beginning of said anodically oxidizing than toward the end of said anodically oxidizing.

3. The method according to claim 1, further comprising:

melting an electrolyte in the fuel cell with the precursor electrode and, during said anodically oxidizing, flushing a cathode chamber with at least one of nitrogen and carbon dioxide and flushing an anode chamber with a mixture of steam and carbon dioxide.

4. The method according to claim 3, wherein the nitrogen and carbon dioxide are supplied to the cathode chamber in a ratio of 1.0/0.0 to 0.0/1.0 vol. % and the steam and carbon dioxide are supplied to the anode chamber in a ratio of 0.1/0.9 to 0.9/0.1 vol. %.

5. The method according to claim 1, wherein the precursor electrode is made of porous sintered nickel sponge and said anodically oxidizing follows installation of a plurality of electrodes in fuel cells of a fuel cell stack.

6. The method according to claim 1, wherein the precursor electrode comprises a film of carbonyl nickel, and following installation in a fuel cell of a fuel cell stack, is heated in situ and then oxidized anodically.

7. The method according to claim 1, wherein said precursor electrode is a double-layer precursor electrode comprising cobalt and nickel or carbonyl cobalt and carbonyl nickel and wherein said anodically oxidizing results in a double-layer electrode.

8. The method according to claim 1, further comprising producing a precursor electrode made of Ni/CO, Ni/Fe, Co/Mn, or Fe/Mn for an alloy cathode.

9. A cathode for a molten carbonate fuel cell made by assembling a layered arrangement comprising a precursor electrode, a matrix layer of molten carbonate, and a porous anode; anodically oxidizing the porous precursor electrode using a curve that can be determined in advance for the current density; and doping said oxidized precursor electrode by contacting with molten carbonate.

10. The cathode according to claim 9, wherein said anodically oxidizing is done using a predetermined current density curve.

11. The cathode according to claim 10, wherein a higher current density is imposed at the beginning of said anodically oxidizing than toward the end of said anodically oxidizing.

12. The cathode according to claim 9, wherein the precursor electrode is made of porous sintered nickel sponge and said anodically oxidizing follows installation of a plurality of electrodes in fuel cells of a fuel cell stack.

13. The cathode according to claim 9, wherein the precursor electrode comprises a film of carbonyl nickel, and following installation in a fuel cell of a fuel cell stack, is heated in situ and then oxidized anodically.

14. The cathode according to claim 9, wherein said precursor electrode is a double-layer precursor electrode comprising cobalt and nickel or carbonyl cobalt and carbonyl nickel.

* * * * *